US012722782B1

(12) United States Patent
Schweighart et al.

(10) Patent No.: US 12,722,782 B1
(45) Date of Patent: Sep. 1, 2026

(54) PAYLOAD LIFT APPARATUS FOR VEHICLES

(71) Applicant: The Boeing Company, Arlington, VA (US)

(72) Inventors: Samuel Adam Schweighart, Fairfax, VA (US); Daniel Vincent Uhlig, Warrenton, VA (US)

(73) Assignee: THE BOEING COMPANY, Arlington, VA (US)

(*) Notice: Subject to any disclaimer, the term of this patent is extended or adjusted under 35 U.S.C. 154(b) by 0 days.

(21) Appl. No.: 19/210,893

(22) Filed: May 16, 2025

(51) Int. Cl.
*B64D 1/22* (2006.01)
*B64C 27/00* (2006.01)
*B66C 1/12* (2006.01)

(52) U.S. Cl.
CPC ................ *B64D 1/22* (2013.01); *B64C 27/00* (2013.01); *B66C 1/12* (2013.01)

(58) Field of Classification Search
CPC ... B64D 1/22; B64U 2101/64; B64U 2101/67
See application file for complete search history.

(56) References Cited

U.S. PATENT DOCUMENTS 3,801,070 A * 4/1974 Piasecki .................. B66C 13/08 254/312
6,533,220 B2 * 3/2003 Schuster .................. H02G 1/02 244/137.4
9,079,662 B1 * 7/2015 Duffy ...................... B64C 37/02
9,205,922 B1 * 12/2015 Bouwer ................... B64D 9/00
9,845,154 B2 * 12/2017 Behrens ................... B64D 1/22
11,500,120 B2 * 11/2022 Døssing Andreasen . B64D 3/00
2019/0270518 A1 * 9/2019 Buyse .................. G05D 1/0866
2024/0034489 A1 * 2/2024 Beiro ..................... B64U 20/00
2025/0296711 A1 * 9/2025 Fujiwara ................ B64U 30/20

* cited by examiner

*Primary Examiner* — Joshua J Michener
*Assistant Examiner* — Cindi M Curry
(74) *Attorney, Agent, or Firm* — Hanley, Flight & Zimmerman, LLC

(57) ABSTRACT

Payload lift apparatus for vehicles are disclosed. A lift vehicle includes a frame, a plurality of rotors supported by the frame, and a plurality of first pulleys coupled to the frame. Pairs of pulleys from the plurality of first pulleys are coupled underneath respective ones of the rotors. A plurality of second pulleys is spaced from the frame, where respective ones of the second pulleys are associated with the pairs of first pulleys. A tension line is coupled to the first pulleys and the second pulleys, where the tension line suspends the second pulleys from the frame.

20 Claims, 10 Drawing Sheets

PAYLOAD LIFT APPARATUS FOR VEHICLES

FIELD OF THE DISCLOSURE

This disclosure relates generally to payload lift apparatus and, more particularly, to payload lift apparatus for vehicles.

BACKGROUND

Lift vehicles, such as helicopters, are used to move payloads through the air more rapidly than using ground transportation and/or to locations that are unreachable via ground transportation.

BRIEF DESCRIPTION OF THE DRAWINGS

In general, the same reference numbers will be used throughout the drawing(s) and accompanying written description to refer to the same or like parts. The figures are not necessarily to scale.

DETAILED DESCRIPTION

Figure 1:
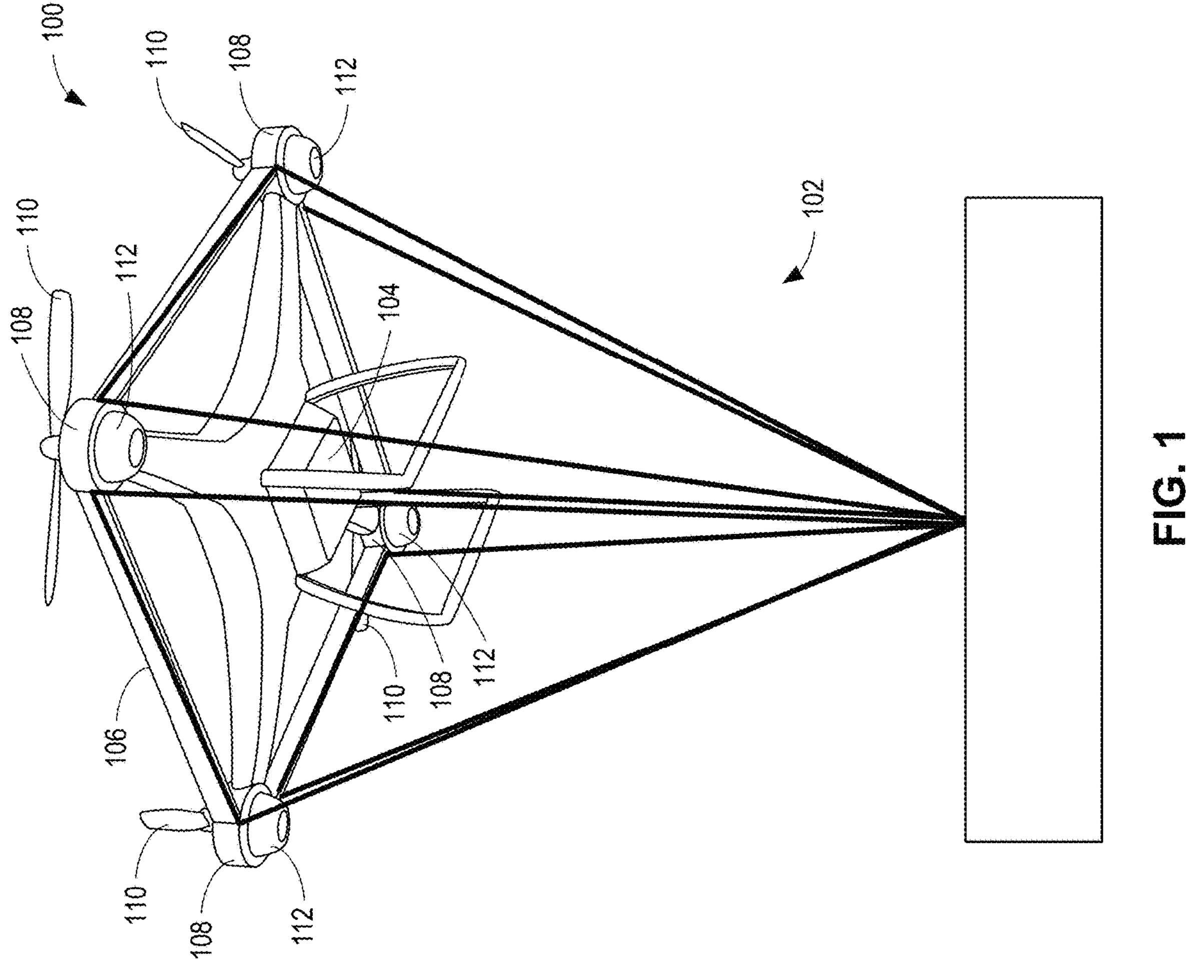
FIG. 1 is a perspective view of an example lift vehicle having an example lift apparatus in accordance with teachings of this disclosure.

Sling load operations involve heavy lifting and/or aerial transports of loads suspended from a lift vehicle or aircraft. Vehicles, including lift vehicles such as helicopters, unmanned vehicles, drones, tiltrotors and/or other aircraft, are employed to lift payloads (e.g., high weight payloads). Slung loads, which are external loads suspended from a vehicle via a cable, sling or other suspension or attachment, can significantly affect the stability and control of the vehicle, particularly due to the moments imparted into the aircraft. A load offset from the center of mass or a swinging load can both impart significant attitude changes (pitch and roll) into the vehicle leading to unstable flight and/or loss of control. To reduce the effects of these forces and moments, most lift vehicles employ a single lift point directly beneath the center of mass of a vehicle. This placement reduces (e.g., minimizes) the effects of an offset or swinging load on the vehicle.

Locating a load attachment point under a center of mass of a lift vehicle (e.g., a helicopter) is structurally convenient and/or advantageous because the load attachment point is aligned with (e.g., located directly under) a main rotor of the vehicle (e.g., a helicopter). The close proximity and straight path from a load attachment point to a main rotor reduces (e.g., minimizes) a structure of a vehicle needed to support a load coupled to the load attachment point.

However, for multi-rotor vehicles, the rotors are spaced out from and/or are not located over a center of a vehicle. In other words, the rotors are not directly aligned with a center of mass of a vehicle. Instead, the rotors are distributed around an edge of the aircraft. Thus, a load attachment point under (e.g., directly under) a center of mass of a vehicle is positioned at a greater distance from the rotors. To this end, a load path from the center lift attachment point to the rotors is at a greater distance in a multi-rotor vehicle (e.g., compared to a single rotor vehicle). As a result, an increase in a structural mass of a vehicle is needed to support such a central load attachment point, which can produce a prohibitively heavy vehicle and/or reduce a lifting capability of a vehicle.

One approach is to provide lift attachment points directly underneath each rotor and attach the load via individual ropes coupled to the lift attachment points directly under each rotor. This configuration significantly simplifies a load path between the load and the rotors, thereby reducing a structural mass of the vehicle and enables the vehicle to lift heavier loads (e.g., improves a lift capability of a vehicle). However, attaching a load directly under the rotors located at the extents of the vehicle can cause the load to impart significant moments (e.g., in pitch and roll) to the vehicle. For example, it can be difficult for a vehicle to change its attitude (pitch or roll) because a change in attitude can result in a large restorative moment from the slung load.

To reduce or prevent large restorative moments from a slung load, vehicles or aircraft can include large, high-bandwidth, active winches at each connection of the lifting cables. Such winches can actively control a length and/or tension in the cable, reducing (e.g., minimizing) moments applied to the vehicle by the load. Such winches can be prohibitively heavy however, and as such may make the vehicle too heavy for sufficient lifting capability. Additionally, such winches require active control. For example, a control system would be needed to control operation of the winches based on a detected or measured length or tension of the cable during operation of the vehicle.

Examples disclosed herein overcome the above-noted deficiencies and include a passive, self-balancing lift apparatus for vehicles. Specifically, examples disclosed herein employ a passive, self-balancing pulley assembly or system. As used herein, a passive assembly or system means that no external forces (e.g., winches, motors, etc.) are needed to operate the lift apparatus. Examples lift apparatus disclosed herein passively maintains or locates the center of gravity of a load coupled to the vehicle (e.g., directly) underneath a center of gravity of the vehicle (e.g., a self-balancing load system) when the vehicle changes attitude (e.g., changes pitch orientation, roll orientation, yaw orientation, etc.) in the same manner as a single center point lift system. Thus, the example passive, self-balancing pulley assembly or system disclosed herein provides a load path (e.g., directly) under each rotor and reduces the effects of an offset or swinging load on the vehicle similarly to a single-rotor, single load attachment configuration. As a result of the example lift apparatus disclosed herein eliminating or reducing moments exerted on the vehicle by external loads, the vehicle can travel at high forward speeds and/or can conduct routine maneuvers during flight (e.g., in the pitch, roll and/or yaw directions). Additionally, example lift apparatus disclosed herein maintains the attachment points (e.g., directly)

under the rotors, thus preventing the need for additional structure that adds undesirably significant weight to the vehicle.

An example frame system disclosed herein includes a frame having a plurality of sides, a plurality of pulleys, and a tension wire or cable coupled with the pulleys. Specifically, each side of the frame includes a first pulley coupled to a first end of the frame, a second pulley coupled to a second end of the frame opposite the first pulley, and a third pulley coupled to (e.g., suspended from) the frame via the cable and positioned between the first pulley and the second pulley. In some examples, the pulleys are fixed to the frame via a mounting bracket. In some examples, the pulleys are coupled to the frame via a swivel mount to enable the pulleys to swivel relative to the frame during a lifting operation. In some examples, the pulleys of the lift apparatus provide a fixed pulley system. In some examples, the pulleys of the lift apparatus provide a compound pulley system.

FIG. 1 is a perspective view of an example lift vehicle 100 having an example lift apparatus 102 in accordance with teachings of this disclosure. The lift vehicle 100 of the illustrated example includes a body or fuselage 104 having a frame 106 that supports a plurality of rotors 108. Each of the rotors 108 of the illustrated example includes a blade 110 (e.g., a propeller) driven by a motor 112. In some examples, each rotor 108 can include one or more blades 110 and/or one or more motors 112. In some examples, the rotors are driven by a motor. In some examples, the rotors are driven respective engines. In some examples, the lift vehicle 100 can include an energy source (e.g., a battery back, a fuel tank, etc.) for storing energy for driving the motors 112. Additionally, the lift vehicle 100 of the illustrated example is an unmanned vehicle. Therefore, the lift vehicle 100 includes a control board (e.g., a controller) for receiving commands and operates the motors 112 based on the received commands. In some examples, the lift vehicle 100 can be a manned vehicle, and an operator or pilot can input commands via a console (e.g., one or more levers, one or more foot pedals, a throttle, etc.) located in the fuselage 104. The lift vehicle 100 of the illustrated example is a quad copter. However, the lift vehicle 100 can include any number of rotors 108 (e.g., two rotors, three rotors, five rotors, etc.). However, in some examples, the lift vehicle 100 can be a helicopter, a tiltrotor vehicle, vertical takeoff and landing vehicle (VTOL), and/or any other type of lift vehicle(s).

Figure 2:
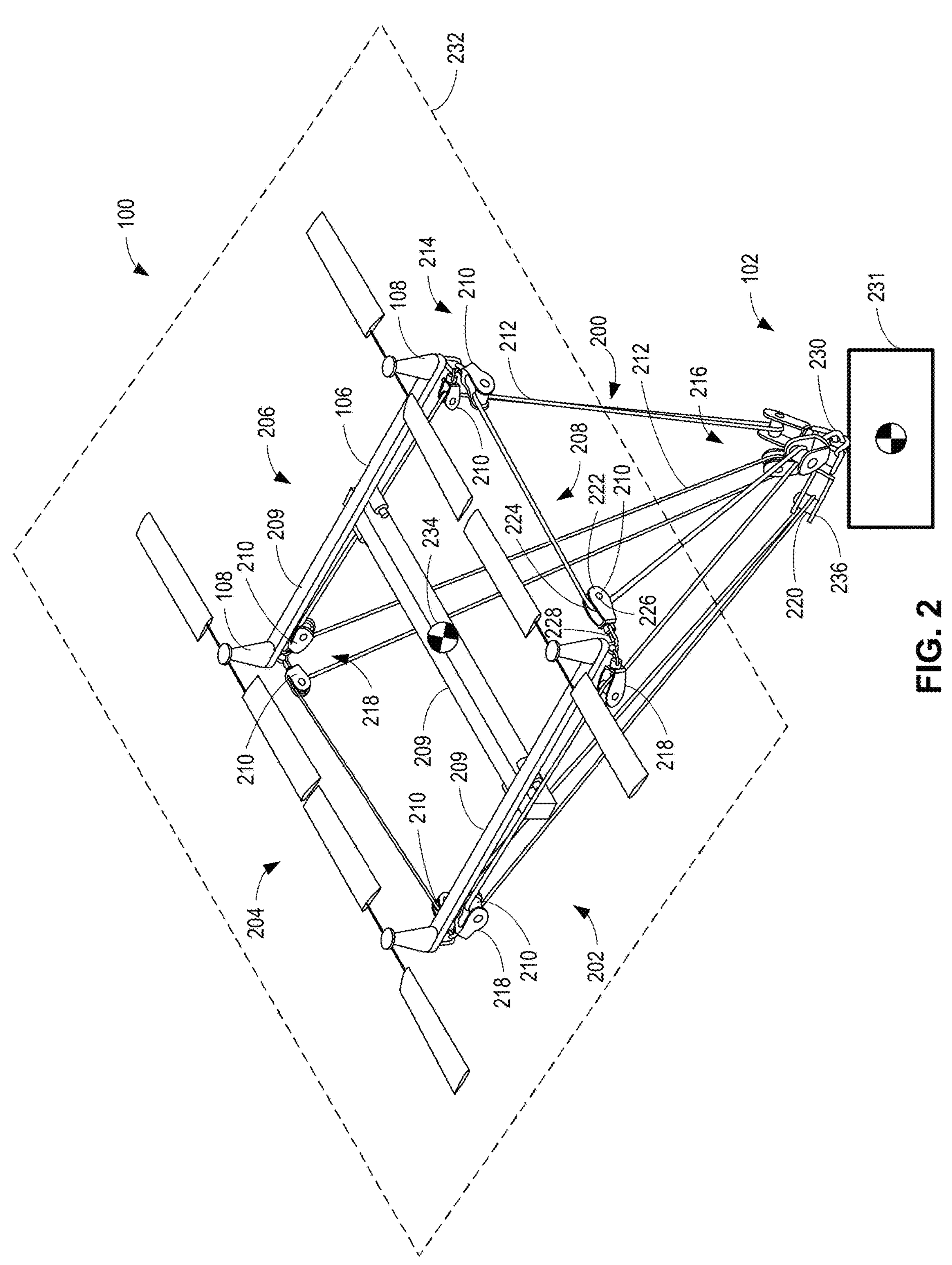
FIG. 2 is a perspective view of the example lift vehicle of FIG. 1.

FIG. 2 is a perspective of the example lift vehicle 100 and the example lift apparatus 102 of FIG. 1. The example lift apparatus 102 disclosed herein is a hoist assembly 200 (e.g., a system) coupled to the frame 106. The frame 106 of the illustrated example includes a first frame portion or side 202 (e.g., a front or forward side), a second frame portion or side 204 (e.g., a right side), a third frame portion or side 206 (e.g., a rear side), and a fourth frame portion or side 208. The frame 106 of the illustrated example can be a plurality of beams 209 composed of steel, fiberglass, aluminum, an alloy and/or any other material(s). The beams 209 are coupled together to form the frame 106 to support the rotors 108.

The example hoist assembly 200 of the illustrated example includes a plurality of pulleys 210 and a tension line 212 (e.g., a unitary or single tension line) operatively coupled to (e.g., interconnects with) each of the pulleys 210. Specifically, the tension line 212 is reeved (e.g., continuously reeved, threaded, meshed, etc.) with the hoist assembly 200 in a specific arrangement or pattern to provide a self-balancing load system. The hoist assembly 200 of the illustrated example includes a first set of pulleys 214 (e.g., a plurality of first pulleys) coupled to the frame 106, a second set of pulleys 216 (e.g., a plurality of second pulleys) spaced from the frame 106, and the tension line 212 coupled to the first set of pulleys 214 and the second set of pulleys 216. Specifically, the second set of pulleys 216 is spaced from the first set of pulleys 214 and/or the frame 106 (e.g., in the vertical orientation). In particular, the first set of pulleys 214 is spaced about the rotors 108. For example, a pair 218 from the first set of pulleys 214 is coupled to or located the frame 106 below (e.g., directly underneath or slightly offset relative to) respective ones of the rotors 108. A respective one 220 of the second set of pulleys 216 is associated with a respective one of the pair 218 of the first set of pulleys 214. Thus, each of the frame sides 202-208 includes a pair 218 of pulleys from the first set of pulleys 214 and a pulley 220 from the second set of pulleys 216 that are coupled via the tension line 212.

The pulleys 210 each include a pulley frame 222, a wheel 224 (e.g., a sheave, a caster, a roller, a ring, etc.) and a spindle or shaft 226 to couple the wheel 224 and the pulley frame 222. The wheel 224 can rotate relative to the pulley frame 222 to enable the tension line 212 to move along or around the wheel 224 of the pulley 210. In some examples, the pulleys 210 can include single sheave pulley, a flat belt pulley, a v-belt pulley, a cable pulley sheave, a sprocket, a gear, and/or any other structure for enabling movement of the tension line 212 around or along a desired pathway. The first set of pulleys 214 of the illustrated example is coupled to the frame 106 via a mount 228 (e.g., a plate, a mounting bracket). In some examples, the mount 228 can be a fixed mounting bracket that fixes (e.g., anchors) a position of the first set of pulleys 214 relative to the frame 106 (e.g., provides anchor points). As used herein, a pulley being fixed to the frame 106 means that the pulley 210 is anchored to the frame 106 and cannot slide (e.g., along a track) and/or swivel relative to the frame 106. In some examples, the first set of pulleys 214 can be coupled to the frame 106 via a swivel mount to enable the pulley frame 222 of the first set of pulleys 214 to swivel, rotate or spin relative to the frame 106. In some examples, the first set of pulleys 214 can be mounted to the frame 106 via a track that enables the first set of pulleys 214 to slide along a length of the frame 106 (e.g., the frame sides 202-208).

The second set of pulleys 216 provides an anchor or attachment point 230 to enable attachment of a load 231 to the lift vehicle 100. The anchor 230 is located within a perimeter 232 defined by the rotors 108. Specifically, the anchor 230 is located underneath (e.g., vertically aligned and below) a center of gravity 234 of the lift vehicle 100 (e.g., when the vehicle 100 is at rest, hovering, non-accelerating, etc.). Thus, the second set of pulleys 216 is positioned within a perimeter of the first set of pulleys 214 and/or the anchor 230 is positioned within the perimeter 232 of the rotors 108. To provide the anchor 230, the pulley frames 222 of the second set of pulleys 216 are coupled together via connectors 236 (e.g., eyelet connectors, eye splice, spelter sockets, swaged sockets, welds, and/or any other connector(s)). Thus, the second set of pulleys 216 can move (e.g., rotate or swivel) via the connectors 236 during operation. Thus, the second set of pulleys 216 are movable pulleys that move with the load 231 (e.g., in a vertical direction) and the first set of pulleys 214 are fixed pulleys that are fixed in the vertical direction. In some examples, the first set of pulleys 214 are fixed in the vertical direction, but can swivel relative to the frame 106. In some examples, a second tension line (e.g., a cable), a hook, a socket and/or other connector can be attached to and/or depend from respective ends of the pulley frames 222 of the second set of pulleys 216.

In the illustrated example, the tension line 212 holds or suspends the second set of pulleys 216 from the frame 106. The tension line 212 of the illustrated example is a cable, a wire, a rope, a chain, etc. Specifically, the tension line 212 of the illustrated example is unitary cable (e.g., a single cable loop) that is continuously reeved with the pulleys 210. The tension line 212 of the illustrated example is a single wire or cable having its ends jointed or coupled to provide a closed-loop pulley system. Thus, respective ends of the tension line 212 are joined, connected or coupled together (e.g., fastened, fused, fixed, etc.). The tension line 212 of the illustrated example can be plastic, metal, steel, a combination thereof, and/or any other material(s). For example, the tension line 212 of the illustrated example can be composed of Ultra High Molecular Weight Polyethylene (UHMWP). In some examples, the tension line 212 can include a first material and a second material different than the first material. For example, the tension line 212 can have a first portion made from a first material such as, for example, a plastic and a second portion made from of a second material such as, for example, steel, tungsten, etc. For example, to increase a transmission of torque from an external source (e.g., a motor 810 of FIG. 8) to one of the pulleys 210, having a tension line 212 that includes a second material (e.g., a chain) to interface with the pulley can improve torque transfer, while using a first material (e.g., a rope) for the tension line 212 that does not interface with a pulley improves, for example, overall strength, cost reduction, and/or any other benefit(s). In some examples, the tension line 212 can be a chain, a rope, a cable, a rigid line, a flexible line, an elastic cord, and/or any other tension line that can move along the pulleys 210 and support a load (e.g., the load 231). In some examples, the tension line 212 can be a braided wire (e.g., a steel wire). In some examples, the tension line 212 includes a first portion that is rope and a second portion that is chain. For example, the pulleys 210 can include sprockets or teeth, where portions of the tension line 212 that wrap around and/or are to move along the pulleys 210 are chains and portions of the tension line 212 that do not interact or interface with the pulleys 210 are a cable, wire or rope.

Figure 3:
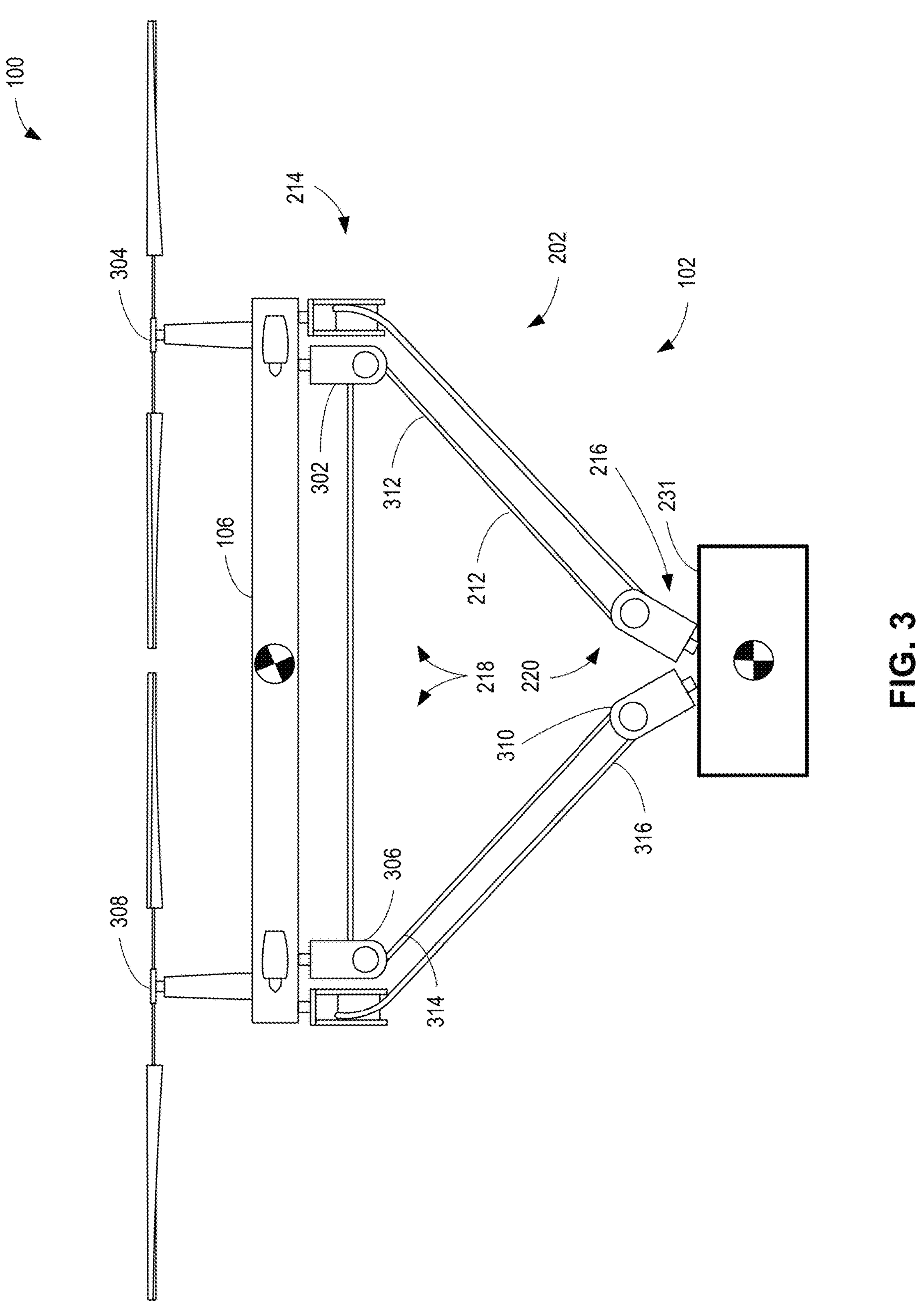
FIG. 3 is a front view of the example lift vehicle of FIG. 1.

FIG. 3 is a front view of the example lift vehicle 100 of FIGS. 1 and 2. In the illustrated example, the front side 202 of the frame 106 includes the pair 218 from the first set of pulleys 214 and the first one 220 of the second set of pulleys 216. For example, a first pulley 302 of the first set of pulleys 214 is coupled to the frame 106 adjacent a first rotor 304, a second pulley 306 of the first set of pulleys 214 is coupled to the frame 106 adjacent a second rotor 308, and a third pulley 310 of the second set of pulleys 216 is suspended from the frame 106. The tension line 212 is coupled to the first pulley 302, the second pulley 306 and the third pulley 310. Specifically, the tension line 212 passes from the first pulley 302 to the second pulley 306, and from the second pulley 306 to the third pulley 310. A first portion 312 of the tension line 212 interfaces with the first pulley 302 (e.g., wraps around the first pulley 302), a second portion 314 of the tension line 212 interfaces with the second pulley 306 (e.g., wraps around the second pulley 306) and a third portion 316 of the tension line 212 interfaces with the third pulley 310 (e.g., wraps around the third pulley 310).

Figure 4:
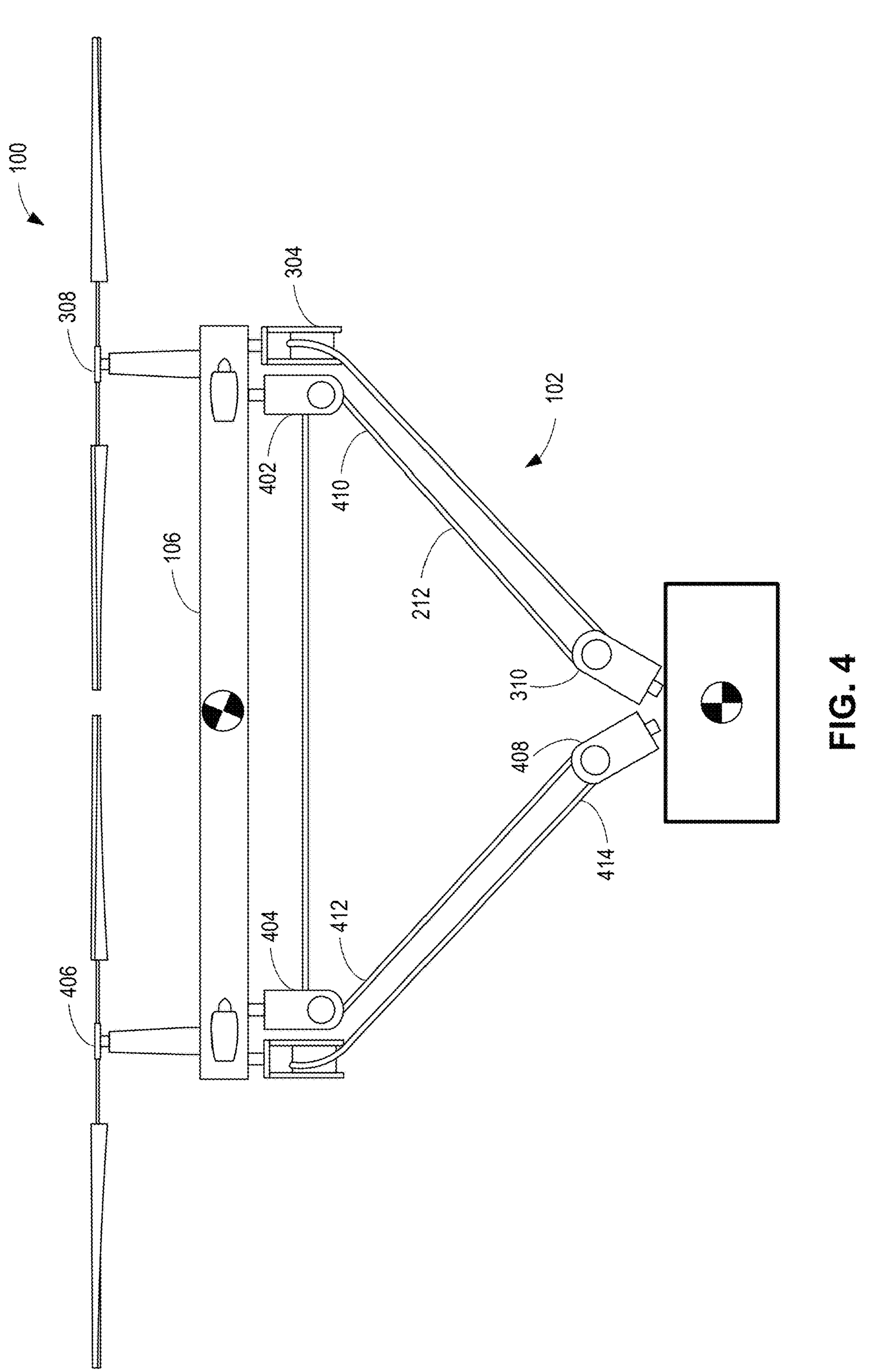
FIG. 4 is a left view of the example lift vehicle of FIG. 1.

FIG. 4 is a right side view of the example lift vehicle 100 of FIGS. 1-3. In the illustrated example, the lift apparatus 102 includes a fourth pulley 402 of the first set of pulleys 214 coupled to the frame 106 adjacent the second rotor 308, a fifth pulley 404 of the first set of pulleys 214 coupled to the frame 106 adjacent a third rotor 406, and a sixth pulley 408 of the second set of pulleys 216 suspended from the frame 106 via the tension line 212. Specifically, the tension line 212 passes from the third pulley 310 (FIG. 3) to the fourth pulley 402, from the fourth pulley 402 to the fifth pulley 404, and from the fifth pulley 404 to the sixth pulley 408. A fourth portion 410 of the tension line 212 interfaces with the fourth pulley 402 (e.g., wraps around the fourth pulley 402), a fifth portion 412 of the tension line 212 interfaces with the fifth pulley 404 (e.g., wraps around the fifth pulley 404) and a sixth portion 414 of the tension line 212 interfaces with the sixth pulley 408 (e.g., wraps around the sixth pulley 408).

Figure 5:
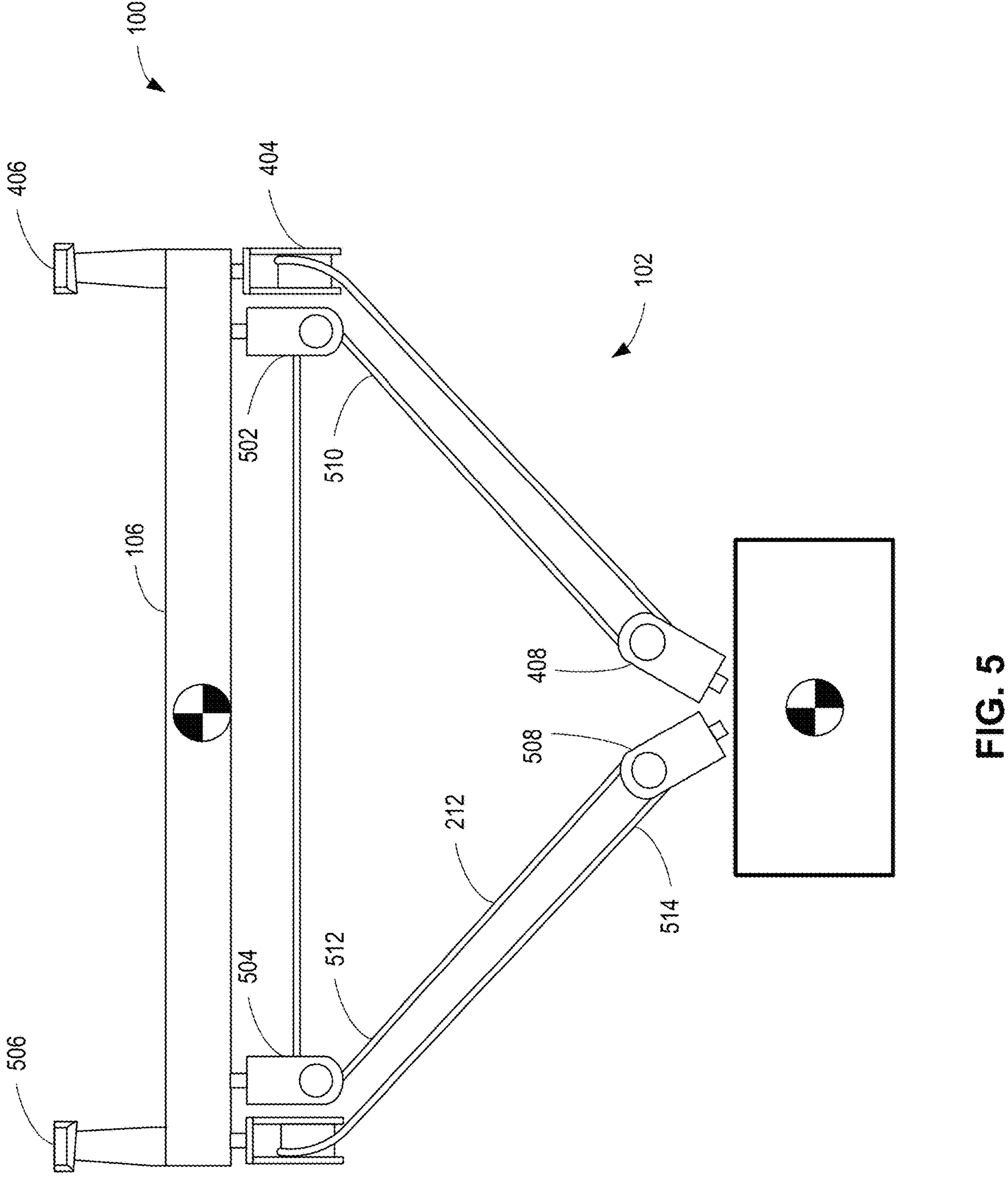
FIG. 5 is a rear view of the example lift vehicle of FIG. 1.

FIG. 5 is a rear view of the example lift vehicle 100 of FIGS. 1-4. In the illustrated example, the lift apparatus 102 includes a seventh pulley 502 coupled to the frame 106 adjacent the third rotor 406, an eighth pulley 504 coupled to the frame 106 adjacent a fourth rotor 506, and a ninth pulley 508 suspended from the frame 106 via the tension line 212. The tension line 212 passes from the sixth pulley 408 (FIG. 4) to the seventh pulley 502, from the seventh pulley 502 to the eighth pulley 504, and from the eighth pulley 504 to the ninth pulley 508. A seventh portion 510 of the tension line 212 interfaces with the seventh pulley 502 (e.g., wraps around the seventh pulley 502), an eighth portion 512 of the tension line 212 interfaces with the eighth pulley 504 (e.g., wraps around the eighth pulley 504) and a ninth portion 514 of the tension line 212 interfaces with the ninth pulley 508 (e.g., wraps around the ninth pulley 508).

Figure 6:
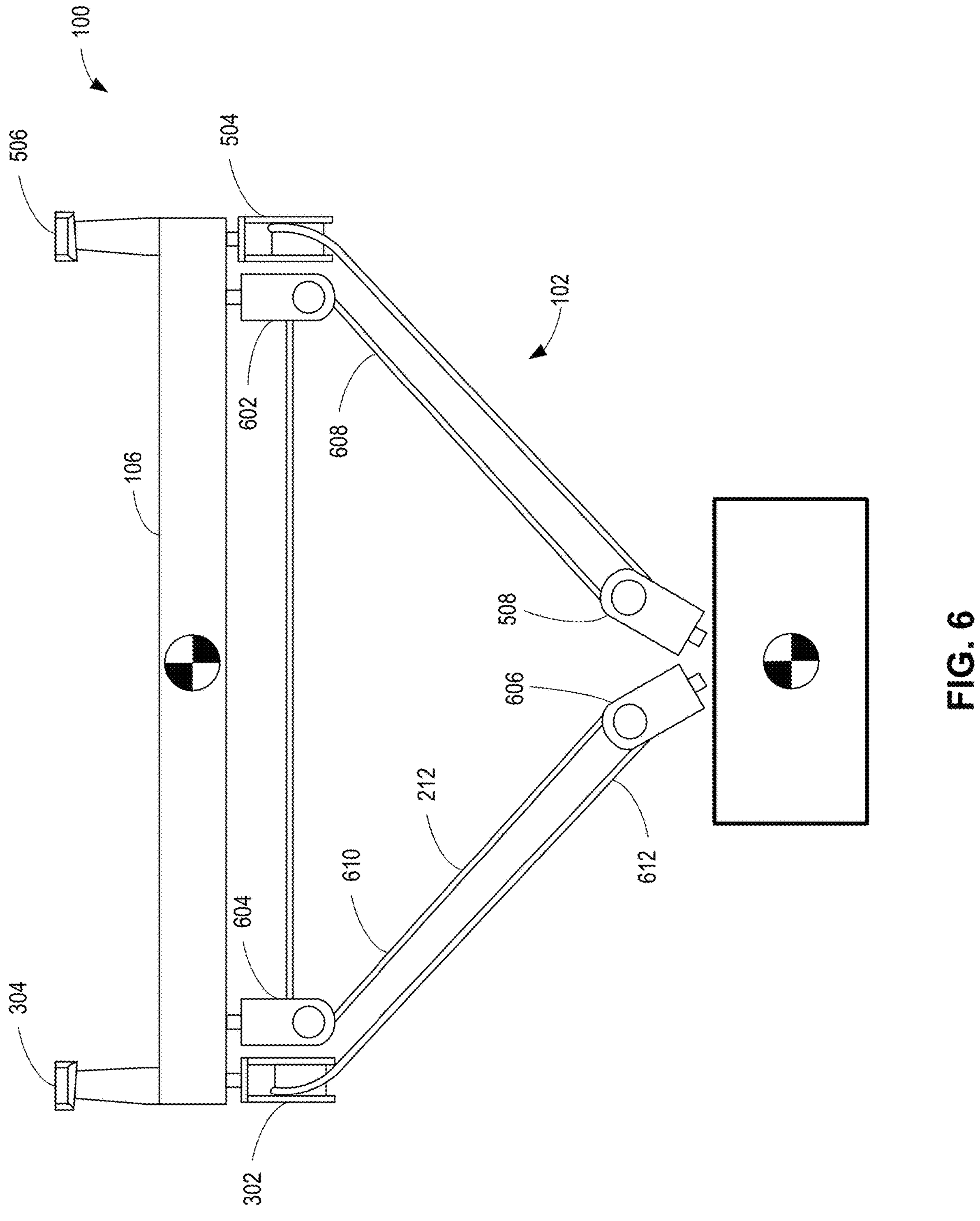
FIG. 6 is a right view of the example lift vehicle of FIG. 1.

FIG. 6 is a left side view of the example lift vehicle 100 of FIGS. 1-5. In the illustrated example, the lift apparatus 102 includes a tenth pulley 602 coupled to the frame 106 adjacent the fourth rotor 506, an eleventh pulley 604 coupled to the frame 106 adjacent the first rotor 304, and a twelfth pulley 606 suspended from the frame 106 via the tension line 212. The tension line 212 passes from the ninth pulley 508 (FIG. 5) to the tenth pulley 602, from the tenth pulley 602 to the eleventh pulley 604, from the eleventh pulley 604 to the twelfth pulley 606, and from twelfth pulley 606 to the first pulley 302 (FIG. 3). A tenth portion 608 of the tension line 212 interfaces with the tenth pulley 602 (e.g., wraps around the tenth pulley 602), an eleventh portion 610 of the tension line 212 interfaces with the eleventh pulley 604 (e.g., wraps around the eleventh pulley 604) and a twelfth portion 612 of the tension line 212 interfaces with the twelfth pulley 606 (e.g., wraps around the twelfth pulley 606).

Referring to FIGS. 1-6, the tension line 212 snakes, wraps, loops or otherwise extends from the first pulley 302 to the second pulley 306 to the third pulley 310 to the fourth pulley 402 to the fifth pulley 404 to the sixth pulley 408 to the seventh pulley 502 to the eighth pulley 504 to the ninth pulley 508 to the tenth pulley 602 to the eleventh pulley 604 to the twelfth pulley 606 and to the first pulley 302. The tension line 212 is coupled or joined together at its respective ends to provide a closed loop, unitary wire (e.g., a closed loop pulley system). In some examples, the first pulley 302 can be omitted and an end of the tension line 212 can be mounted to the frame 106.

Figure 7:
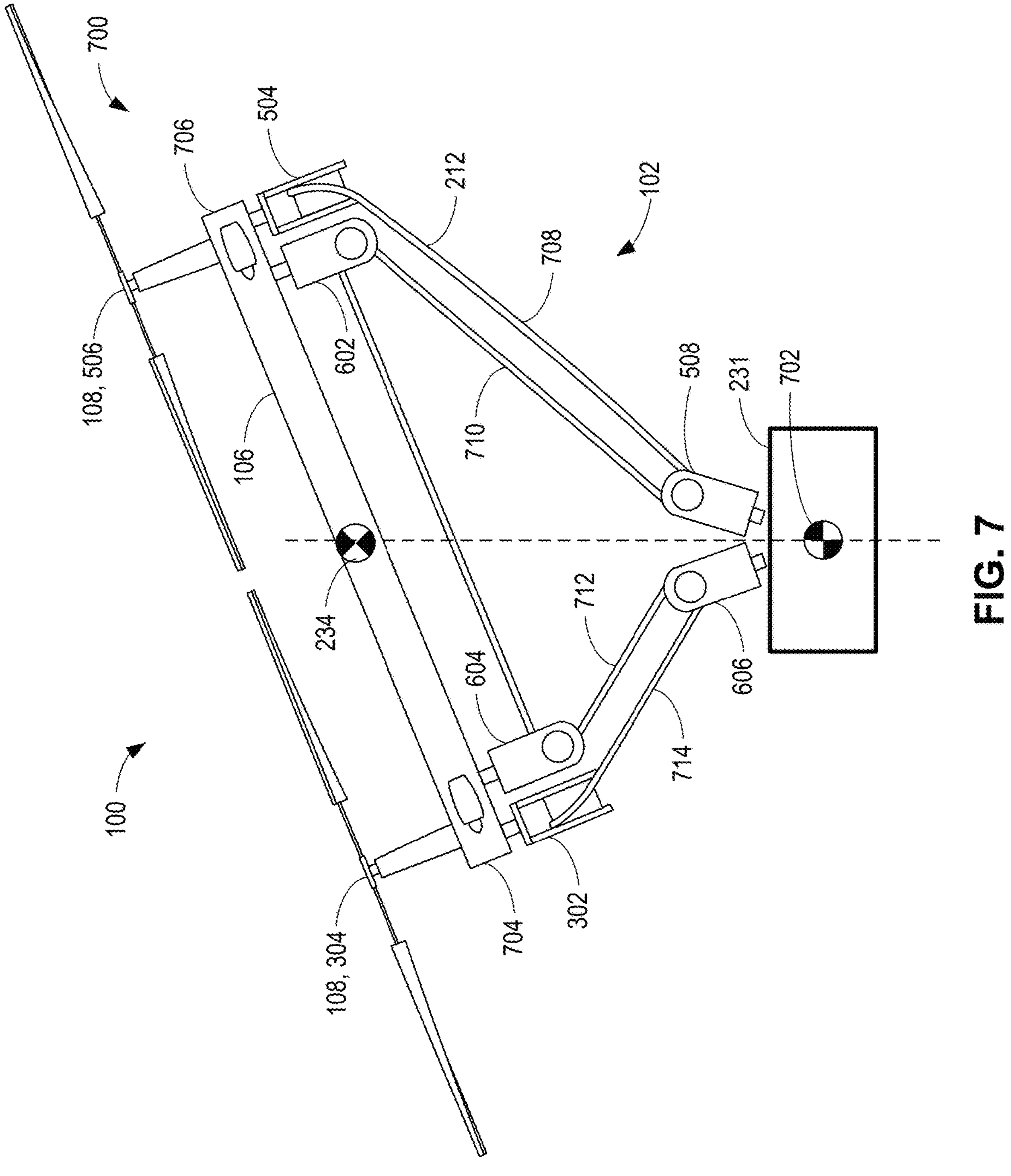
FIG. 7 is a side view of the example lift vehicle of FIG. 1 in a forward condition.

FIG. 7 is a perspective view of the example lift vehicle 100 of FIG. 1 with the rotors 108 in a tilted condition 700. In operation, the lift apparatus 102 passively maintains a center of gravity 702 of the load 231 under (e.g., directly under, vertically aligned with, etc.) the center of gravity 234 of the lift vehicle 100 (e.g., when the vehicle 100 is at rest, hovering, or in a non-accelerating condition). Specifically, to passively maintain the center of gravity 702 of the load 231 under the center of gravity 234 of the lift vehicle 100, the tension line 212 moves around and/or along the pulleys 210 during flight in response to moments or forces imparted to the lift vehicle 100 via the load 231 coupled to the second set of pulleys 216. When the lift vehicle 100 pitches forward, the load 231 (e.g., a slung load) swings relative to the vehicle 100 and applies a restorative moment or other forces that can restrict, deter or otherwise diminishes the lift vehicle 100 from pitching freely. However, the tension line 212 of the lift apparatus 102 moves along the pulleys 210 to dissipate or reduce effects of moments produced by the load 231. For example, respective lengths of portions of the tension line 212 between the first set of pulleys 214 and the second set of pulleys 214 (e.g., vertical portions of the tension line 212) can increase and decrease during movement or attitude changes of the lift vehicle 100. As the attitude changes, the load 231 can move or swing relative to the lift vehicle 100 when the lift vehicle 100 changes orientation (e.g., in the pitch direction, the roll direction, and/or the yaw direction). For instance, the load 231 can swing backwards when the vehicle 100 pitches forward immediately and/or the load 231 can drift backwards due to wind drag during flight. However, the hoist assembly 200 of the illustrated example enables the vehicle 100 to move with the load 231 with reduced or minimal restoring force. For instance, when the lift vehicle 100 tilts a front end 704 of the frame 106 forward to produce forward thrust, a rear end 706 of the frame 106 can be elevated or lifted higher relative to the front end 704. As a result, the load 231 pulls on a first portion 708 of the tension line 212 between the eighth pulley 504 and the ninth pulley 508 and/or a second portion 710 of the tension line 212 between the tenth pulley 602 and the ninth pulley 508, thereby increasing a length of the first portion 708 and/or the second portion 710 of the tension line 212 between the ninth pulley 508 and the respective eight pulley 504 and the tenth pulley 602. In turn, a length of a third portion 712 of the tension line 212 between the eleventh pulley 604 and the twelfth pulley 606 and/or a length of a fourth portion 714 of the tension line 212 between the first pulley 302 and the twelfth pulley 606 shortens or reduces. Additionally, in non-acceleration conditions and/or non-wind drag conditions, the hoist assembly 200 can return or move the load 231 such that the center of gravity 702 of the load 231 is substantially aligned with the center of gravity 234 of the lift vehicle 100. Accordingly, the tension line 212 shifts or moves relative to the pulleys 210 in response to a weight of the load 231 to enable the load 231 to move or swing relative to the frame 106 and/or to maintain a position of the center of gravity 702 of the load 231 underneath or below (e.g., vertically aligned with) the center of gravity 234 of the lift vehicle 100. As a result, the load 231 does not impart moment forces to the lift vehicle 100, regardless of an attitude of the lift vehicle 100. In other words, the lift apparatus 102 diminishes, restricts or otherwise prevents restorative moments caused by the load 231 (e.g., a slung load) when the lift vehicle 100 changes orientation during flight (e.g., pitches forward to generate forward thrust, roll, etc.).

In some examples, one or more of the pulleys 210 can include a gear, a sprocket, etc. In some such examples, the portions 312-316, 410-414, 510-514 and 608-612 of the tension line 212 that interact with the pulleys 210 can include a chain or wire for interfacing with the gear or sprocket and the remaining portions (e.g., the portions 708-714) of the tension line 212 that do not interface or engage with the pulleys 210 can be a cable, belt, wire or rope. In some examples, the tension line 212 can be chain and the pulleys 210 can be sprockets. In some examples, the first set of pulleys 214 can be sprockets and the second set of pulleys 216 can be wheel pulleys (e.g., a v-groove pulley, a belt pulley, etc.).

Figure 8A:
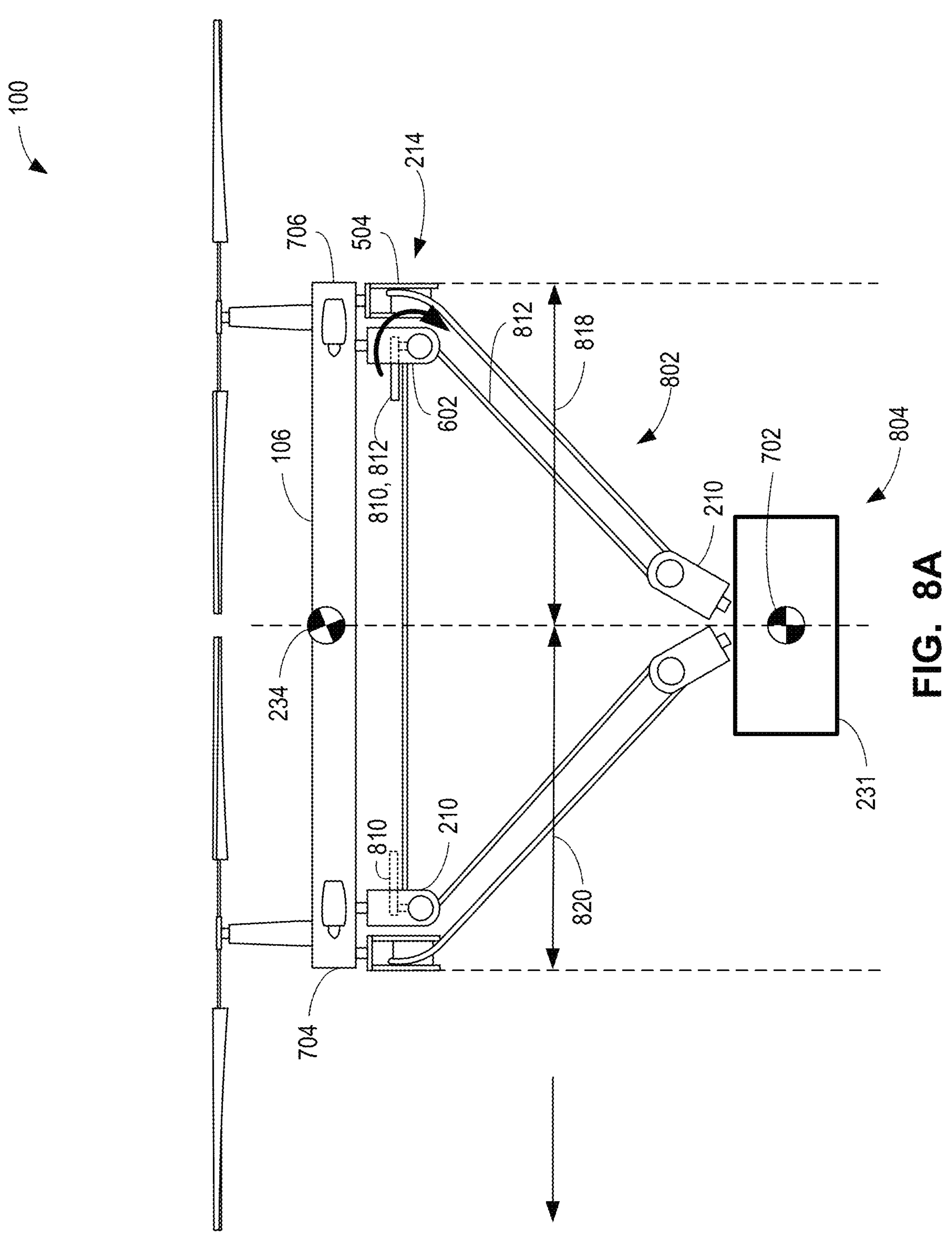
FIG. 8A is a side view of the example lift vehicle of FIG. 1 having another example lift apparatus disclosed herein.
Figure 8B:
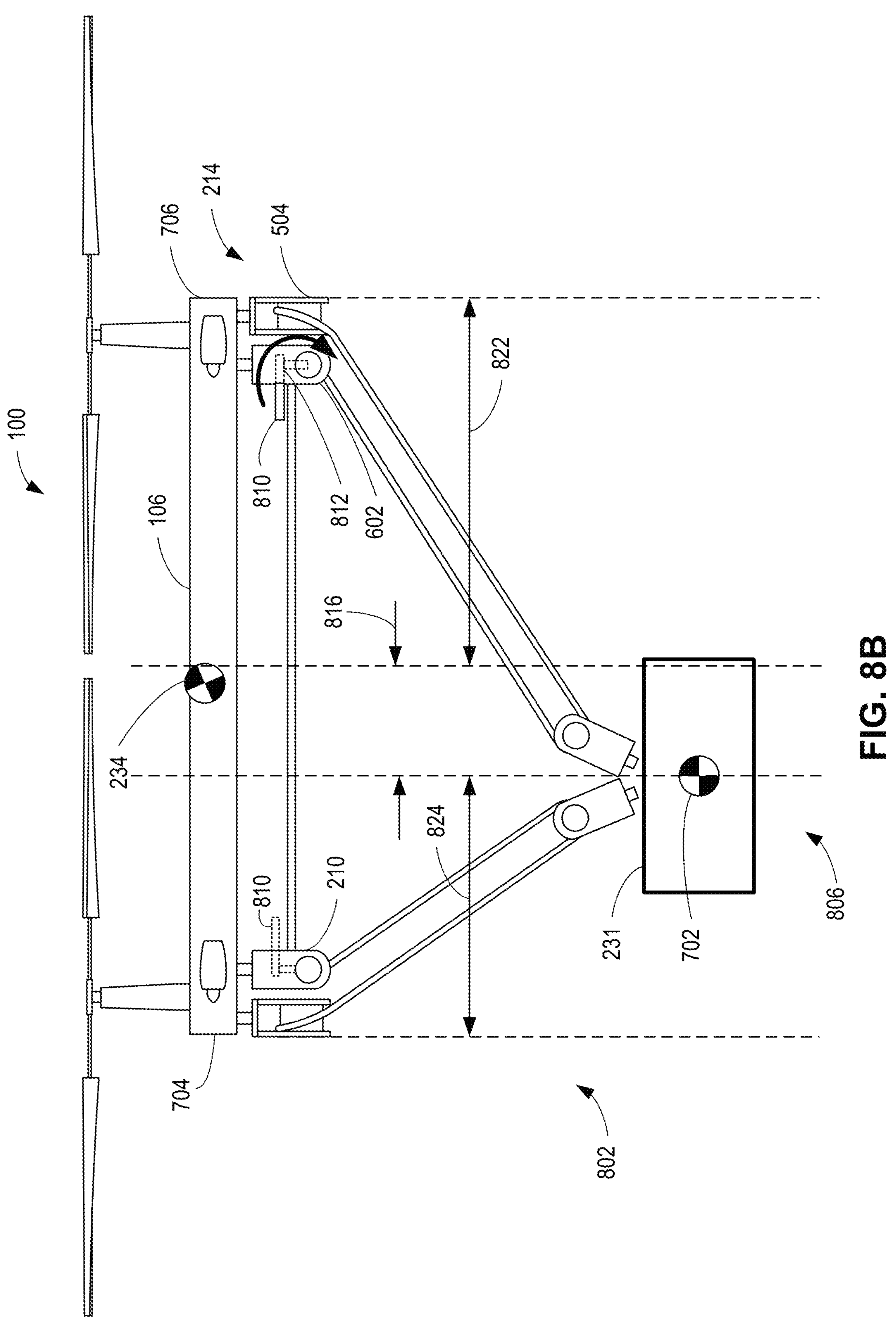
FIG. 8B is a side view of FIG. 8A showing a load in an example second position.

FIG. 8A is a side view of the lift vehicle 100 having another example lift apparatus 802 disclosed herein. FIG. 8A illustrates an example load 231 in an example first position 804 (e.g., an initial or central position). FIG. 8B is a side view of FIG. 8A showing the example load 231 in a second position 806 (e.g., a forward position). Many of the components of the example lift apparatus 802 of FIGS. 8A-8B are substantially similar or identical to the components described above in connection with FIGS. 1-7. As such, those components will not be described in detail again below. Instead, the interested reader is referred to the above corresponding descriptions for a complete written description of the structure and operation of such components. To facilitate this process, similar or identical reference numbers will be used for like structures in FIGS. 8A-8B as used in FIGS. 1-7.

Referring to FIGS. 8A and 8B, the lift apparatus 802 of the illustrated example is substantially similar to the lift apparatus 102 of FIGS. 1-7 except the lift apparatus 802 of the illustrated example includes one or more motors 810 coupled to respective ones of a first set of pulleys 214. Specifically, the lift apparatus 802 of the illustrated example includes a first motor 812 coupled to a tenth pulley 602. Although not shown, a second motor can be coupled to the fifth pulley (e.g., a fifth pulley 404 directly opposite the tenth pulley 602 of FIG. 4). In some examples, the lift apparatus 802 of the illustrated example includes a plurality of motors 810, where respective ones of the motors 810 are coupled to respective ones of the first set of pulleys 214. Thus, each pulley 214 can include a dedicated motor. The motors 810 can be employed to enable lateral positioning capabilities. For example, the motor(s) 810 can be employed to move the load laterally (e.g., horizontally in the orientation of FIGS. 8A and 8B). For example, the motor(s) 810 can be employed to move the load 231 laterally from the first position 804 to the second position 806 when the lift vehicle 100 is hovering over a drop-off location. In the first position 804, the center of gravity 702 of the load 231 aligns (e.g., vertically aligns or is located directly below) the center of gravity 234 of the lift vehicle 100. In the second position 806, the center of gravity 702 of the load 231 is offset (e.g., horizontally) a distance 816 relative to the center of gravity 234 of the lift vehicle 100. In the illustrated example, the load 231 in FIG. 8B is moved toward the front end 704 of the frame 106. Thus, in FIG. 8A, when the load 231 is in the first position 804, the center of gravity 702 of the load 231 is centrally located such that a distance 818 between the center of gravity 702 of the load 231 and the rear side 706 of the frame 106 is the same as (e.g., is equal to) a distance 820 between the center of gravity 702 of the load 231 and the front end 704 of the frame 106. The motor(s) 810 provide force to move the load laterally, as a majority of a lifting load is taken by the pulleys 210. Thus, the motor(s) 810 bias a location of the load 231 in a horizontal direction. To move the load 231 between the first position 804 and the second position 806, the motor(s) 810 can be employed to rotate or turn the pulleys 214 (e.g., the tenth pulley 602 and the fifth pulley 404) to move the tension line 212 and thereby move the load 231 laterally in a horizontal direction. Thus, in FIG. 8B, when the load 231 is in the second position 806, the center of gravity 702 of the load 231 is offset relative to the center of gravity 234 of the vehicle 100 such that a distance 822 between the center of gravity 702 of the load 231 and the rear side 706 of the frame 106 is different (e.g., greater than or not equal to, but not less) than a distance 824 between the center of gravity 702 of the load 231 and the front end 704 of the frame 106.

Figure 9:
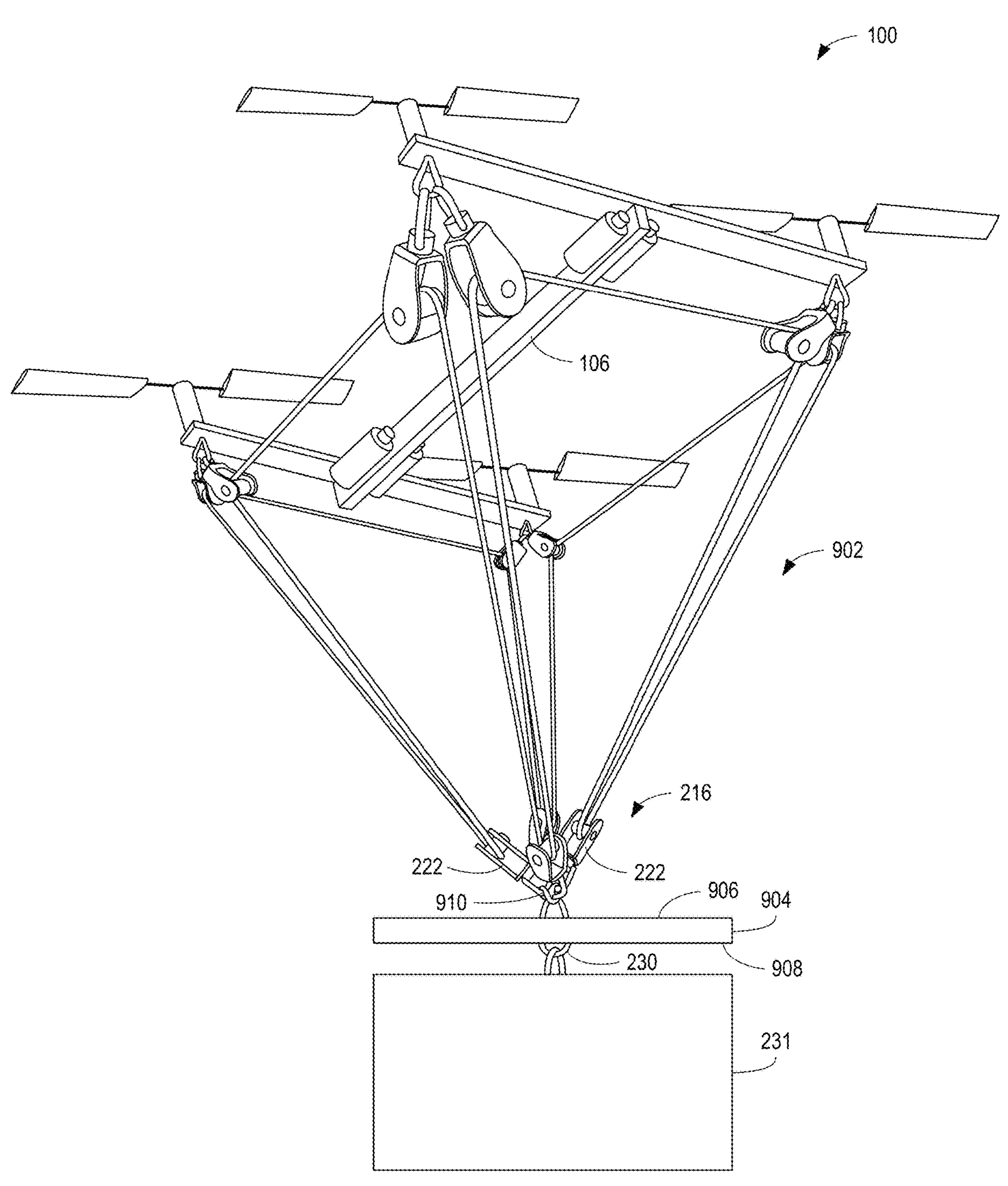
FIG. 9 is a perspective view of another example lift apparatus disclosed herein.

FIG. 9 is a perspective view of the example lift vehicle 100 having another example lift apparatus 902 disclosed herein. In the illustrated example, the lift apparatus 902 is substantially similar to the lift apparatus 102 of FIGS. 1-7 except the lift apparatus 902 of the illustrated example includes a platform 904. The second set of pulleys 216 can be coupled to a first side 906 of the platform 904 and the anchor 230 can be positioned on a second side 908 of the platform 904 opposite the first side 906 (e.g., where the first side 906 of the platform 904 is oriented toward a frame 106 of the lift vehicle 100 and the second side 908 of the platform 904 is oriented toward the load 231). The pulley frames 222 of the second set of pulleys 216 are coupled together via connectors 910 (e.g., eyelet connectors, eye splices, spelter sockets, swaged sockets, welds, and/or any other connector(s)). In some examples, a second tension line (e.g., a cable, a hook, a socket and/or other connector) can be attached to respective ends of the pulley frames 222 of the second set of pulleys 216 for use for attachment to the load.

Payload lift apparatus 102, 802, 902 disclosed herein are not limited to vehicles having four rotors. Example lift apparatus 102, 802, 902 disclosed herein can be implemented with a vehicle having any number of rotors, blades, etc. For example, an example lift vehicle disclosed can have a triangular shaped frame to support three rotors. Each side of the frame can having a pair of the first set of pulleys 214 and one of the second set of pulleys 216. Thus, each side of the triangular shaped frame can include three total pulleys. With a three rotor vehicle, an example lift apparatus can have a total of nine pulleys (i.e., up to three pulleys on each of the sides of the frame).

Although each example lift apparatus 102, 802, 902 disclosed above have certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

Example methods, apparatus, systems, and articles of manufacture to payload lift apparatus for vehicles are disclosed herein. Further examples and combinations thereof include the following:

Example 1 includes a lift vehicle comprising a frame, a plurality of rotors supported by the frame, a plurality of first pulleys coupled to the frame, pairs of pulleys from the plurality of first pulleys coupled underneath respective ones of the rotors, a plurality of second pulleys spaced from the frame, respective ones of the second pulleys associated with the pairs of first pulleys, and a tension line coupled to the first pulleys and the second pulleys.

Example 2 includes the lift vehicle of example 1, wherein the tension line is a cable.

Example 3 includes the lift vehicle of any one of examples 1-2, wherein the first pulleys each include a first sheave to receive the tension wire and a pulley frame to attach to the frame.

Example 4 includes the lift vehicle of any one of examples 1-3, wherein second pulleys each include a second sheave to receive the tension wire and a pulley frame to attach to a load attachment point.

Example 5 includes the lift vehicle of any one of examples 1-4, wherein the tension line to suspend the second pulleys from the frame.

Example 6 includes the lift vehicle of any one of examples 1-5, wherein the second pulleys include an anchor to enable attachment of a load to the lift vehicle.

Example 7 includes the lift vehicle of any one of examples 1-6, wherein the anchor is located within a perimeter defined by the rotors.

Example 8 includes the lift vehicle of any one of examples 1-7, wherein the anchor is located below a center of gravity of the lift vehicle.

Example 9 includes the lift vehicle of any one of examples 1-8, wherein the tension line moves along the pulleys during flight in response to moments or forces imparted to the lift vehicle via a load coupled to the second pulleys.

Example 10 includes the lift vehicle of any one of examples 1-9, wherein the second pulleys are positioned within a perimeter of the first pulleys.

Example 11 includes the lift vehicle of any one of examples 1-10, including a motor coupled to one of the first pulleys.

Example 12 includes the lift vehicle of any one of examples 1-11, including a plurality of motors, respective ones of the motors coupled to respective ones of the first pulleys.

Example 13 includes a lift apparatus comprising a frame to support a plurality of rotors, a first pulley coupled to the frame adjacent a first rotor, a second pulley coupled to the frame adjacent a second rotor, a third pulley suspended from the frame, and a cable coupled to the first pulley, the second pulley and the third pulley, the cable passes from the first pulley to the second pulley, and from the second pulley to the third pulley.

Example 14 includes the lift apparatus of example 13, further including a fourth pulley coupled to the frame adjacent the second rotor, a fifth pulley coupled to the frame adjacent a third rotor, and a sixth pulley suspended from the frame via the cable, the cable to pass from the third pulley to the fourth pulley, from the fourth pulley to the fifth pulley, and from the fifth pulley to the sixth pulley.

Example 15 includes the lift apparatus of any one of examples 13-14, further including a seventh pulley coupled to the frame adjacent the third rotor, an eighth pulley coupled to the frame adjacent a fourth rotor, and a ninth pulley suspended from the frame via the cable, the cable to pass from the sixth pulley to the seventh pulley, from the seventh pulley to the eighth pulley, and from the eighth pulley to the ninth pulley.

Example 16 includes the lift apparatus of examples 13-15, further including a tenth pulley coupled to the frame adjacent the fourth rotor, an eleventh pulley coupled to the frame adjacent the first rotor, and a twelfth pulley suspended from the frame via the cable, the cable to pass from the ninth pulley to the tenth pulley, from the tenth pulley to the eleventh pulley, from the eleventh pulley to the twelfth pulley, and from twelfth pulley to the first pulley.

Example 17 includes a lift apparatus comprising a frame having a plurality of sides, a plurality of pulleys, and a cable operatively coupled to the pulleys, wherein each side of the frame includes a first pulley coupled to a first end of the frame, a second pulley coupled to a second end of the frame opposite the first pulley, and a third pulley suspended from the frame via the cable and positioned between the first pulley and the second pulley.

Example 18 includes the lift apparatus of example 17, wherein the pulleys are fixed to the frame via a mounting bracket.

Example 19 includes the lift apparatus of examples 17-18, wherein the pulleys are coupled to the frame via a swivel mount to enable the pulleys to swivel relative to the frame during a lifting operation.

Example 20 includes the lift apparatus of examples 17-19, wherein the pulleys of the lift apparatus provide a compound pulley system.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A lift vehicle comprising:
- a frame;
- a plurality of rotors supported by the frame;
- a plurality of first pulleys coupled to the frame, pairs of pulleys from the plurality of first pulleys coupled underneath respective ones of the rotors;
- a plurality of second pulleys spaced from the frame, respective ones of the second pulleys associated with the pairs of first pulleys; and
- a tension line coupled to the first pulleys and the second pulleys, the tension line having a first terminating end and a second terminating end, wherein the first and second terminating ends of the tension line are joined together.

2. The lift vehicle of claim 1, wherein the tension line is a cable.

3. The lift vehicle of claim 1, wherein the first pulleys each include a first sheave to receive the tension line and a pulley frame to attach to the frame.

4. The lift vehicle of claim 1, wherein the second pulleys each include a second sheave to receive the tension line and a pulley frame to attach to a load attachment point.

5. The lift vehicle of claim 3, wherein the tension line suspends the second pulleys from the frame.

6. The lift vehicle of claim 1, wherein the second pulleys include an anchor to enable attachment of a load to the lift vehicle.

7. The lift vehicle of claim 6, wherein the anchor is located within a perimeter defined by the rotors.

8. The lift vehicle of claim 6, wherein the anchor is located below a center of gravity of the lift vehicle.

9. The lift vehicle of claim 1, wherein the tension line moves along the pulleys during flight in response to moments or forces imparted to the lift vehicle via a load coupled to the second pulleys.

10. The lift vehicle of claim 1, wherein the second pulleys are positioned within a perimeter of the first pulleys.

11. The lift vehicle of claim 1, including a motor coupled to one of the first pulleys.

12. The lift vehicle of claim 1, including a plurality of motors, respective ones of the motors coupled to respective ones of the first pulleys.

13. A lift apparatus comprising:

a frame to support a plurality of rotors;

a first pulley coupled to the frame adjacent a first rotor;

a second pulley coupled to the frame adjacent a second rotor;

a third pulley suspended from the frame;

a cable coupled to the first pulley, the second pulley and the third pulley, the cable passes from the first pulley to the second pulley, and from the second pulley to the third pulley; and a fourth pulley coupled to the frame adjacent the second rotor, a fifth pulley coupled to the frame adjacent a third rotor, and a sixth pulley suspended from the frame via the cable, the cable to pass from the third pulley to the fourth pulley, from the fourth pulley to the fifth pulley, and from the fifth pulley to the sixth pulley.

14. The lift apparatus of claim 13, further including a seventh pulley coupled to the frame adjacent the third rotor, an eighth pulley coupled to the frame adjacent a fourth rotor, and a ninth pulley suspended from the frame via the cable, the cable to pass from the sixth pulley to the seventh pulley, from the seventh pulley to the eighth pulley, and from the eighth pulley to the ninth pulley.

15. The lift apparatus of claim 14, further including a tenth pulley coupled to the frame adjacent the fourth rotor, an eleventh pulley coupled to the frame adjacent the first rotor, and a twelfth pulley suspended from the frame via the cable, the cable to pass from the ninth pulley to the tenth pulley, from the tenth pulley to the eleventh pulley, from the eleventh pulley to the twelfth pulley, and from twelfth pulley to the first pulley.

16. A lift apparatus comprising:

a frame having a plurality of sides;

a plurality of pulleys, wherein the pulleys are coupled to the frame via a swivel mount; and a cable operatively coupled to the pulleys, wherein each side of the frame includes a first pulley coupled to a first end of the frame, a second pulley coupled to a second end of the frame opposite the first pulley, and a third pulley suspended from the frame via the cable and positioned between the first pulley and the second pulley.

17. The lift apparatus of claim 16, wherein the swivel mount enables the pulleys to swivel relative to the frame during a lifting operation.

18. The lift apparatus of claim 16, wherein the pulleys of the lift apparatus provide a compound pulley system.

19. The lift apparatus of claim 13, including a first motor coupled to the first pulley.

20. The lift apparatus of claim 16, including a first motor coupled to the first pulley and a second motor coupled to the second pulley.

* * * * *